US005636799A

United States Patent [19]

Trusty et al.

[11] Patent Number: 5,636,799

[45] Date of Patent: Jun. 10, 1997

[54] FRAME MOUNTED ISOLATED MOTOR DRIVEN ELECTROSTATIC SPRAY SYSTEM

[75] Inventors: Dennis L. Trusty; Oryn B. Wagner; Patrick Kuhn, all of Bismarck, N. Dak.

[73] Assignee: Clark Equipment Company, Woodcliff Lake, N.J.

[21] Appl. No.: 372,377

[22] Filed: Jan. 13, 1995

[51] Int. Cl.$^{6}$ .......................... A01G 25/09; B05B 5/025

[52] U.S. Cl. .......................................... 239/708; 239/172

[58] Field of Search ............................ 239/3, 690, 696, 239/708, 699, 146, 148, 172

[56] References Cited

U.S. PATENT DOCUMENTS

| | | | |
|---|---|---|---|
| 418,738 | 1/1890 | Mowll . | |
| 1,938,138 | 12/1933 | Downs | 226/29 |
| 3,122,320 | 2/1964 | Beck et al. | 239/3 |
| 3,337,138 | 8/1967 | Brown, Jr. et al. | 239/345 |
| 3,339,840 | 9/1967 | Point | 239/3 |
| 3,650,292 | 3/1972 | Platz et al. | 137/561 |
| 3,933,285 | 1/1976 | Wiggins | 239/3 X |
| 3,934,055 | 1/1976 | Tamny | 239/3 X |
| 4,017,029 | 4/1977 | Walberg | 239/15 |
| 4,085,892 | 4/1978 | Dalton | 239/15 |
| 4,109,027 | 8/1978 | Crose | 239/3 X |
| 4,204,844 | 5/1980 | Pilat | 55/10 |
| 4,275,834 | 6/1981 | Spanjersberg et al. | 239/3 |
| 4,284,243 | 8/1981 | Shaner | 239/469 |
| 4,358,059 | 11/1982 | Coffee | 239/691 |
| 4,413,788 | 11/1983 | Schaefer et al. | 239/703 |
| 4,542,855 | 9/1985 | Stacey | 238/690 |
| 4,544,570 | 10/1985 | Plunkett et al. | 427/27 |
| 4,553,702 | 11/1985 | Coffee et al. | 239/690 |
| 4,560,107 | 12/1985 | Inculet | 239/3 |
| 4,621,507 | 11/1986 | Lundqvist | 63/181 R |
| 4,629,119 | 12/1986 | Plunkett et al. | 239/3 X |
| 4,629,164 | 12/1986 | Sommerville | 239/69 |
| 4,634,057 | 1/1987 | Coffee et al. | 239/690 |
| 4,817,690 | 4/1989 | Heeren et al. | 141/338 |
| 4,850,403 | 7/1989 | Wiese | 141/95 |
| 4,881,688 | 11/1989 | Hankvist et al. | 239/691 |
| 4,949,906 | 8/1990 | Godwin | 239/663 |
| 4,997,016 | 3/1991 | Hacknauer et al. | 141/363 |
| 5,004,024 | 4/1991 | Rezmer et al. | 141/298 |
| 5,052,628 | 10/1991 | Wainwright et al. | 239/690 |
| 5,060,701 | 10/1991 | McCunn et al. | 141/21 |
| 5,240,185 | 8/1993 | Kaiju et al. | 239/690 |

FOREIGN PATENT DOCUMENTS

| | | |
|---|---|---|
| 2 635 990 | 1/1976 | France . |
| 2937890 | 4/1981 | Germany . |
| 3110148 | 9/1982 | Germany . |

*Primary Examiner*—Kevin Weldon

*Attorney, Agent, or Firm*—Westman, Champlin & Kelly, P.A.

[57] ABSTRACT

An electrostatic spray system has a support for a liquid container, and the high voltage components mounted through isolators for providing electrical insulation relative to a low voltage or grounded support. The liquid container is connected to a pump that provides the liquid under pressure, after an electric charge is applied to the liquid on the exterior of the liquid container. The liquid container has an open top, and a sprinkler head adds liquid to the liquid container. The sprinkler head is mounted on the low voltage support, but all high voltage components are electrically isolated from low voltage components to insure there is little current leakage back to ground.

21 Claims, 4 Drawing Sheets

FRAME MOUNTED ISOLATED MOTOR DRIVEN ELECTROSTATIC SPRAY SYSTEM

CROSS REFERENCE TO RELATED APPLICATION

Reference is made to copending U.S. Patent application Ser. No. 08/372,564, filed Jan. 13, 1995 and entitled CONTROL RING FOR INPUT SPRAY IN ELECTROSTATIC SPRAY SYSTEM.

BACKGROUND OF THE INVENTION

The present invention relates to a system for providing an electrostatic charge on liquids to be applied to other objects utilizing equipment that is simple to manufacture and use and is electrically isolated from low voltage supports in a manner to reduce the leakage of current to ground.

Various electrostatic spray systems have been advanced for spraying materials. U.S. Pat. No. 4,788,617 discloses an electrostatic spray system which utilizes two containers, with liquid transfer between the containers. An electrostatic charge is applied to a liquid in one container and the liquid is then sprayed onto plants, for example. This device requires two closed tanks that are pressurized and requires control over the current flow between the tanks for operation.

Another arrangement for applying coating materials utilizing an electrostatic spray system is shown in U.S. Pat. No. 3,934,055. An enclosed tank is provided for sprinkling a coating supply, and the unit is then passed across a high voltage electrode on the interior of a hose which carries liquid to a spray gun. An enclosed system is disclosed, with venting to atmosphere and with the use of a grounded outer housing.

It has been discovered that using an open-top container, and controlling the spacing between a head sprinkling liquid into the container and then providing an electrostatic charge to the liquid as it is pumped from the container provides a simplified construction since the container, the pump and other parts are isolated from ground through suitable insulators.

SUMMARY OF THE INVENTION

The present invention relates to an electrostatic spray system which uses an open-top liquid container that is connected to a pump through which a high voltage is applied to the liquid as the liquid is pumped to spray nozzles. The open-top container and pump are mounted on a support or platform that is electrically isolated from electrical ground. As shown the container and pump are mounted on and isolated from a vehicle which may carry the spray system for spraying. The motor for driving the pump is selected to also be electrically isolated from ground, either by use of non-conductor drive motors such as pneumatic or hydraulic motors operating through insulating lines with an insulating fluid, or by having a self-contained power pack on the isolated platform carrying the open-top container and pump.

The outlet of the pump is connected to spray nozzles which are isolated from ground through isolation mountings on booms which carry the nozzles, or if suitable isolation can be achieved, by nozzles that are insulated from their supporting booms.

Current leakage to a sprinkler head supplying the liquid to be sprayed to the open-top tank is controlled by maintaining an appropriate spacing between the spray head and the container, as well as controlling the size of the spray.

A ring that is grounded through a large resistor surrounds the spray and provides a field for controlling the spray size to reduce the likelihood of liquid migrating to the sidewalls of the container.

The container is provided with a splash guard so that there is no excessive splashing toward the top of the container where the sprinkler head is located, and the amount of current leakage back to ground through the spray is minimized. The container itself is preferably made of an insulating material such as a suitable plastic.

The high voltage used for electrostatically charging the spray fluid is provided by placing the voltage from a voltage source onto the pump that is used, so long as the pump has at least portions that are electrically conductive. Hydraulic motors are preferred, particularly for mobile sprayers that have on board hydraulic systems. An air driven motor to power the spray pump also can be utilized. Air is generally considered a non-conductor, and non-conductive air hoses can be used as well to insure maintaining isolation. Battery operated motors can be utilized if the batteries are self-contained and mounted on the insulated support or platform supporting the container and pump.

The primary use envisioned for the present pressurized system is with an agricultural field sprayer to provide for an electrostatically charged liquid that will be applied to plants. The system can be used in many other applications such as paint spraying or the like.

DETAILED DESCRIPTION OF THE PREFERRED EMBODIMENTS

One of the problems that has consistently occurred in electrostatic spray systems is current leakage to ground, regardless of the type of system being utilized.

In the present invention, a spray system is adapted for use in a wide variety of applications, including industrial applications such as spraying films on textiles, and other spraying operations. Additionally, coating agricultural crop seed with various films such as fertilizer, seed starter compounds and fumigants can be done with this type of a sprayer.

Figure 1:
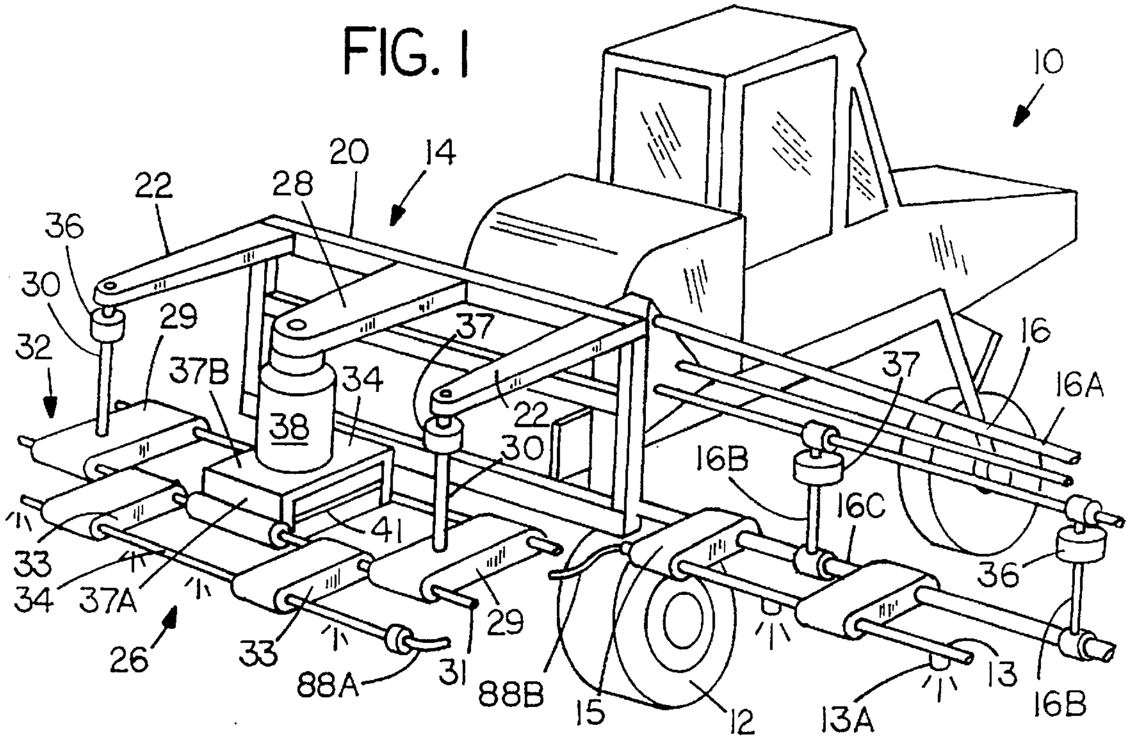
FIG. 1 is a schematic perspective view of a typical field sprayer unit having an electrostatic spray system made according to the present invention installed thereon.

A further application is the use in connection with large field sprayers, and as shown in FIG. 1, a self-propelled field sprayer indicated generally at 10 has suitable support wheels 12 for travel over the ground. A frame assembly 14 is provided at the rear of the sprayer, and supports a pair of conventional spray booms that extend laterally from the vehicle in opposite directions. One spray boom assembly is shown at 16 and includes a low voltage boom 16A supporting insulating rods 16B, which in turn support and insulating material tube 16C. Each tube 16C mounts an insulating material spray nozzle pipe 13 using insulating blocks 15. The spray nozzle pipe 13 has nozzles 13A for emitting a spray of electrostatically charged liquid. Care is taken to insulate the pipe 13 from the boom 16A. The frame assembly 14 also includes a frame cross member 20 having a pair of arms 22 that extend rearwardly and are braced back to the frame assembly 14. The arms 22 support an electrostatic spray assembly indicated at 26.

As shown, the arms 22 are grounded back to the frame assembly 14. The spray assembly 26 is supported from the arms 22 through suitable tubular insulating rods or isolators links 30. The insulating rods 30 can be made of tubular fiberglass or other suitable materials that are good insulators and they are used to support end blocks 29 of insulating material (plastic) which are from part of an insulating frame or support 32. The frame 32 can take any desired configuration, and as shown, the end blocks 29 support a pair of spaced, elongated insulating rods 31 to form the frame 32. A center spray pipe section 34 on which spray nozzles 36 are mounted. Insulating (plastic) blocks 33 are attached to the rear rod 31 and extend to space the spray pipe 34 from the rod 31. The spaced elongated insulating rods 31 aid in reducing surface areas that might become damp and tend to conduct current back to ground.

To minimize migration of moisture back to the grounded arms 22, a pair or inverted insulating cups 36, 36 are supported on the pair of tubular rods or isolator links 30, (and on rods 16B) and sealed tightly on the outer surfaces of the tubular isolator links 30, so that if moisture migrates along the isolator links, the moisture will be stopped by the insulating cup and will not cause a short or current conducting path to the arms 22.

In this form of the invention, the frame 32 is used for supporting an open-top spray liquid container, also called a charge tank, and shown generally at 38, which, as will be disclosed, is made in two sections. The spray liquid container 38 is suitably supported on an insulating material housing 37 that has end panels 37A and a top support panel 37B to form an inverted U-shape. The lower ends of the end panels 37A have hubs mounted on rods 31 of the frame 32. A pump and motor assembly indicated at 40, which are mounted on a cross plate 41 below the top support panel 37B of housing 37 includes a drive motor 42 and a pump 44. The liquid container 38 can be bolted suitably to the housing 37. The support frame 32 and supported components are shown schematically, but are designed to be well insulated from ground and spaced from grounded components. The liquid container 38 also is known as a charge tank and forms a reservoir to store a supply of liquid that is to be electrically charged.

Figure 3:
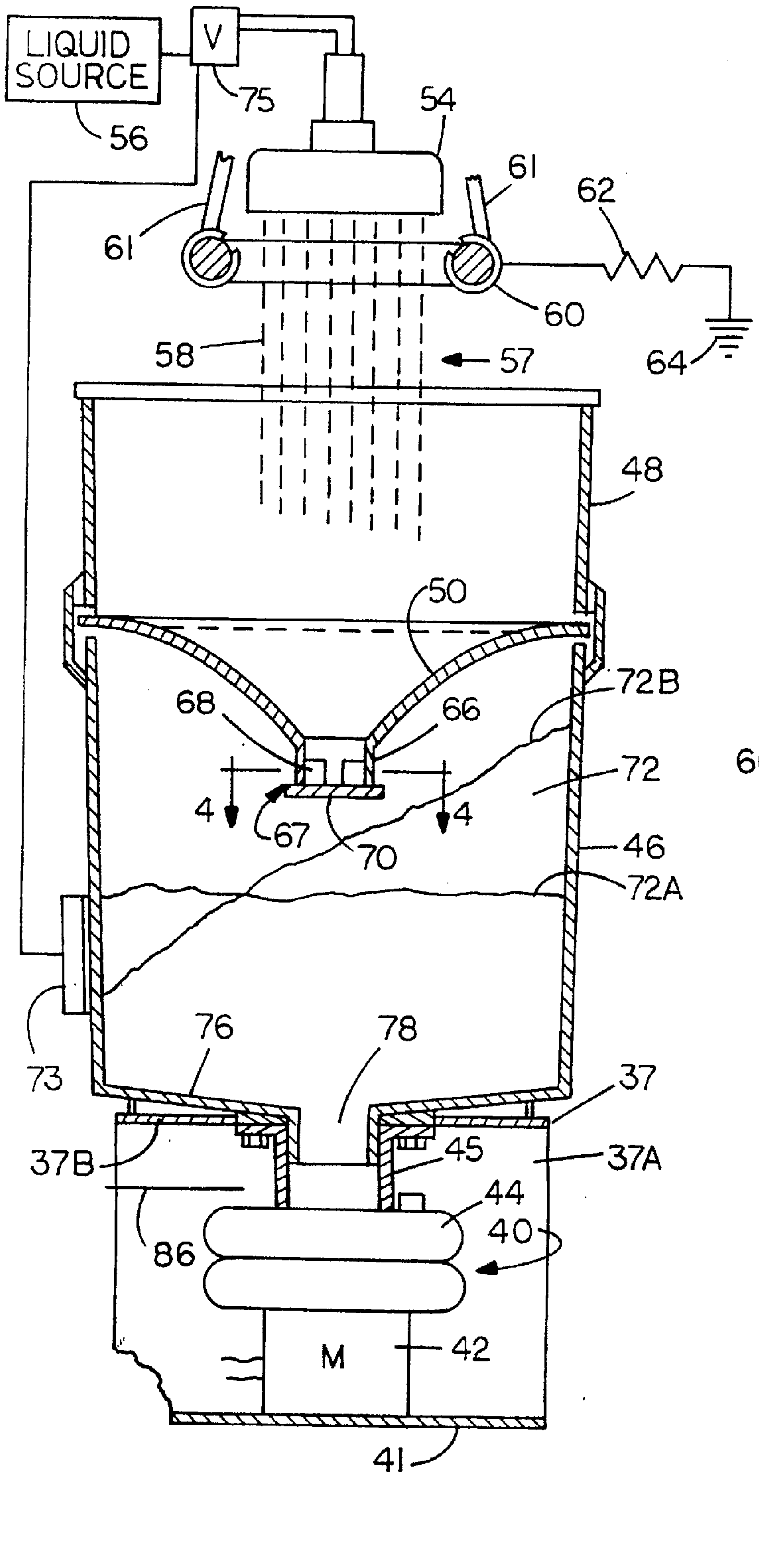
FIG. 3 is an enlarged sectional view of an open-top container used with the spray system of the present invention.
Figure 4:
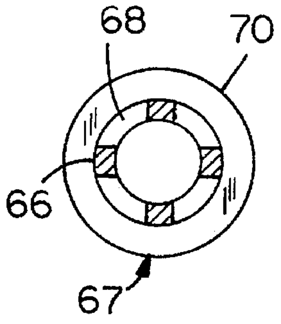
FIG. 4 is a sectional view taken as on line 4—4 in FIG. 3.
Figure 6:
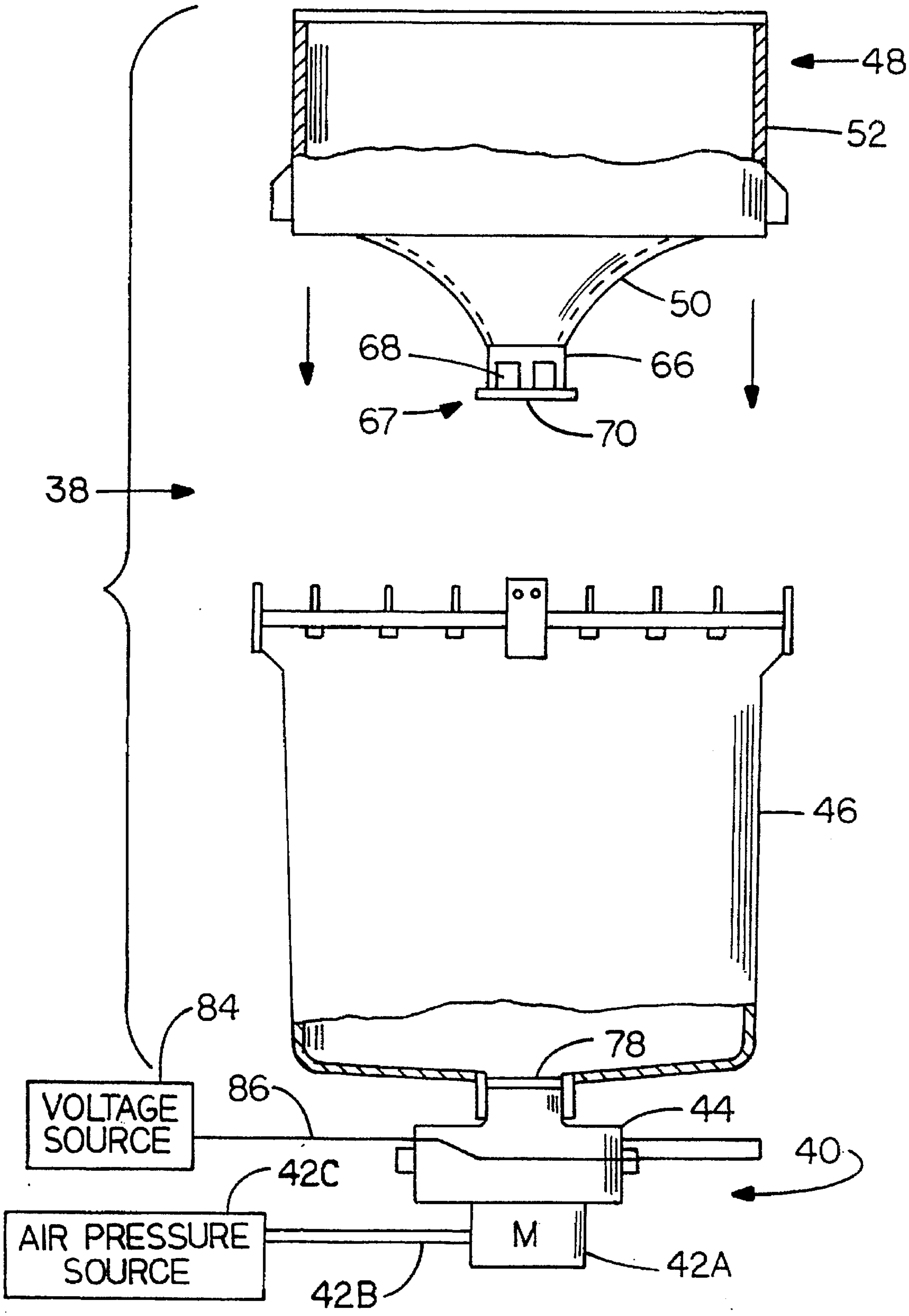
FIG. 6 is an exploded view of a typical container used with the present invention, and utilizing an air motor drive.

As shown in FIGS. 3 and 6, the container 38 is made with a lower portion 46, and an upper portion 48, which is made in two sections. The upper portion 48 has a lower tapered funnel bottom section 50 and an upper cylindrical wall 52. These sections are mounted together to form the container.

A spray or sprinkler head 54 is mounted suitably onto an arm 28 also supported on cross member 20 of frame 14, and provides a shower of conductive liquid from a pressurized source, such as a pump, indicated at 56, to cause a shower of liquid, usually water in the spray system shown, that is in the form of broken streams indicated at 58 to sprinkle into the open top of the spray liquid container 38. The sprinkles 58 of liquid pass through a guard ring 60, which, as shown is supported on insulated supports 61 attached to arm 28. The ring 60 is electrically connected through a large resistor 62 to a low potential, for example ground 64. The use of the large resistor limits any current flow, but permits potential to drop to provide for an effect tending to constrict the width of the overall sprinkle column 57 and minimize the attraction of the liquid spray to the outer side edges of the container upper cylindrical wall 52.

The distance from the sprinkler head 54 to the contact line or ring on funnel portion 50, where the edge of the liquid column 57 contacts the funnel portion, generally represented as a double arrow 65, (FIG. 2) is maintained sufficiently large so that the current leakage back to the sprinkler head, which is connected to ground, is not significant. The streams 58 of liquid in the spray column 57 are maintained so that they are intermittent and do not form a direct conduit for current leakage back to the sprinkler head 54 and the liquid supply.

The funnel bottom 50 has an outlet opening provided with a splash guard 67, as shown perhaps best in FIG. 3, which leads to the lower container portion 46. The splash guard 67 is a cylindrical sleeve 66 that has a plurality of openings 68 in the sidewalls thereof, and a solid or imperforate plate 70 closing the bottom of the cylindrical sleeve 66. This means that liquid (generally water) supplied from the sprinkler or shower head 54, has to pass through the cylindrical sleeve 66 and out the openings 68 to fill the interior chamber 72 of the lower portion 46 of the spray liquid container. The liquid establishes a level, depending on the rate of flow from the sprinkler head 54 and the rate that the liquid is removed. Either the input or removal rate can be adjusted, but usually a suitable level sensor 73 (FIG. 3) will be used to control a flow valve 75 to keep the level within set low and high limits in a conventional manner. The level sensor can be a magnetic float sensor, a capacitive level sensor or other suitable sensor. A typical level is shown at 72A. The splash guard 67 prevents water or other liquids used from splashing upwardly and out of the open-top container 38, even when the mobile sprayer is on a side hill or at an angle where the water level would be at an angle relative to the central axis of the container, as is shown in FIG. 3 at 72B.

The splash guard 67, combined with the funnel bottom 50 prevents excess liquid from splashing into the upper portion 48 of the spray liquid container 38 where the splashed liquid, and any mist from the liquid would be more likely to provide a path for current leakage back to the sprinkler head 54 and to ground.

An outlet 78 from the lower section 46 of the liquid container is in the center of the bottom wall 76. The bottom wall 76 can be slightly curved down to the outlet 78. The pump 44 has an inlet pipe 45 connected to the outlet 78.

The pump 44 is driven by motor 42 to provide pressure in an outlet line 79. The motor 42 is a hydraulic motor 42 in the first form of the invention, which receives its power through hydraulic lines represented at 80. The hydraulic lines are non-conductive, usually some synthetic elastomeric material reinforced with synthetic fibers, so the lines are electrical insulators. The hydraulic fluid, which is an oil, is also non-conductive so that there is no electrical conductive path from the power source used for driving the pump back to ground.

A high voltage source (for example, 20,000 to 60,000 volts) indicated generally at 84 is connected through a highly insulated line 86 to a metal or conductive housing of pump 44. At least one portion of the pump housing is made of an electrical conductor to provide a high voltage, low current input electrode to contact charge the liquid passing through the outlet 78 and into the pump 44.

Figure 5:
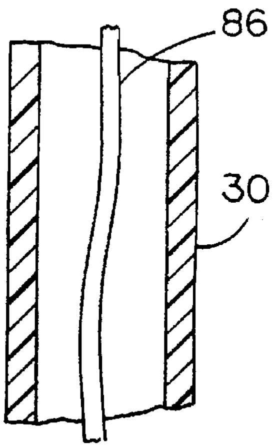
FIG. 5 is a vertical sectional view of a typical isolator tube used for supporting the spray system of the present invention relative to a grounded support.

The insulated high voltage line 86, as shown, passes through the center of one of the tubular insulating rods 30, as illustrated in FIG. 5, and then out through a small opening in the rod. The opening can be filled with a non-conductive putty or gasket material to seal the interior passageway of the tubular rod 30 from moisture. The line 86 can also be connected to an electrode in inlet pipe 45, in the lower portion of container 38 in a valve manifold 88 or outlet line 79, where there is a constant flow of liquid.

Outlet line 79 carries charged liquid under pressure and connects to a manifold 88. The manifold is shown on one end of the frame 32, but the manifold can be supported on cross plate 41 if desired. The manifold 88 has valves that can be manually or automatically opened to connect lines such as 88A to the spray pipe 34, and thus to the nozzles 36, or valves can be selectively opened to lines 88B and 88C which would go to spray pipes on the side extending booms, for example, pipe 13 on boom 16, as shown. The pipe 13 has spray nozzles for applying the charged liquid. All of the spray nozzles can be connected to the pump outlet line 79 at one time, if desired.

FIG. 6 illustrates the container 38 construction, as shown in three parts, with two of the parts assembled for the upper portion 48 forming a funnel. The parts will be mounted together so that the lower container portion 46 supports the upper container portion and the junction can be suitably sealed with a gasket and fasteners or latches. This provides effective splash protection to minimize the amount of current leakage back to ground through the sprinkler head 54. The liquid container 38 is preferably made of a non-conductive plastic, as is the pipe 45, to minimize the likelihood of current leakage to ground. In FIG. 6 an air motor 42A is shown driving pump 44. The motor 42A is provided with air under pressure through a non-conductive line 42B from a pressure source 42C.

Figure 2:
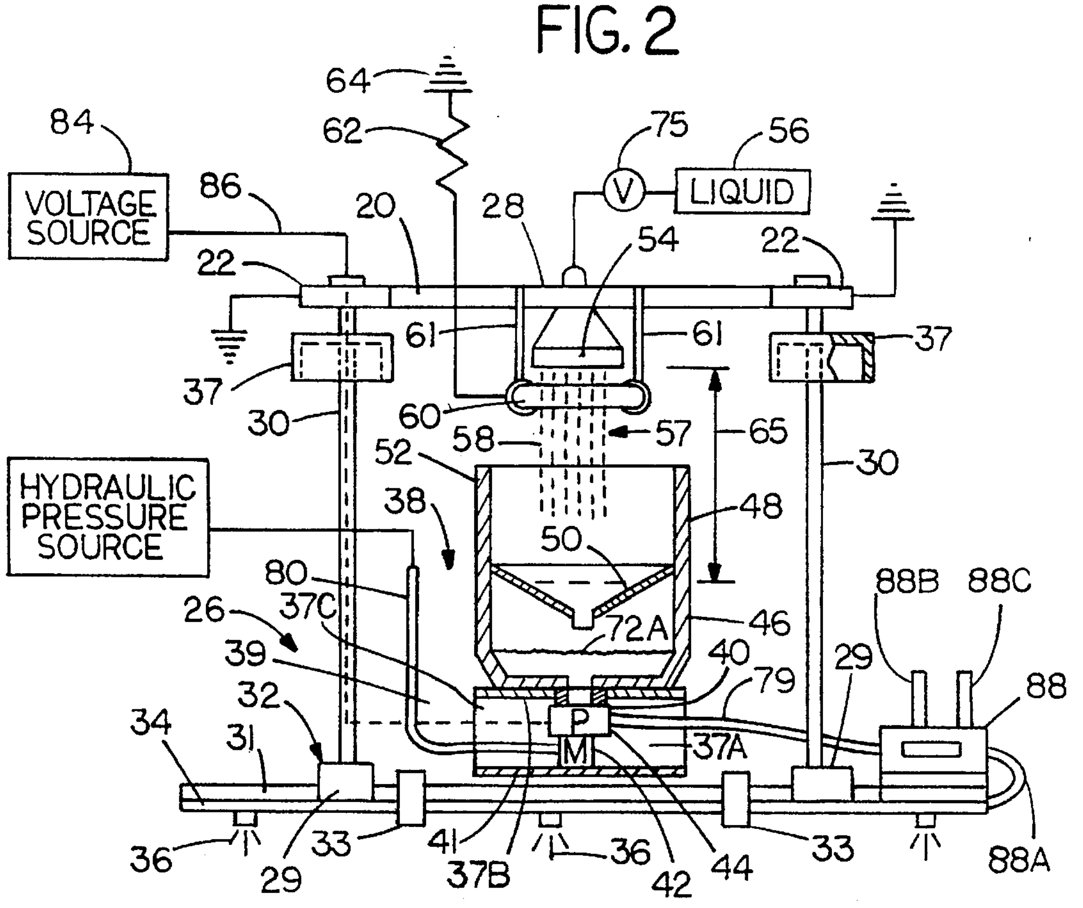
FIG. 2 is an elevational view of a typical electrostatic spray system made according to the present invention with parts broken away.
Figure 7:
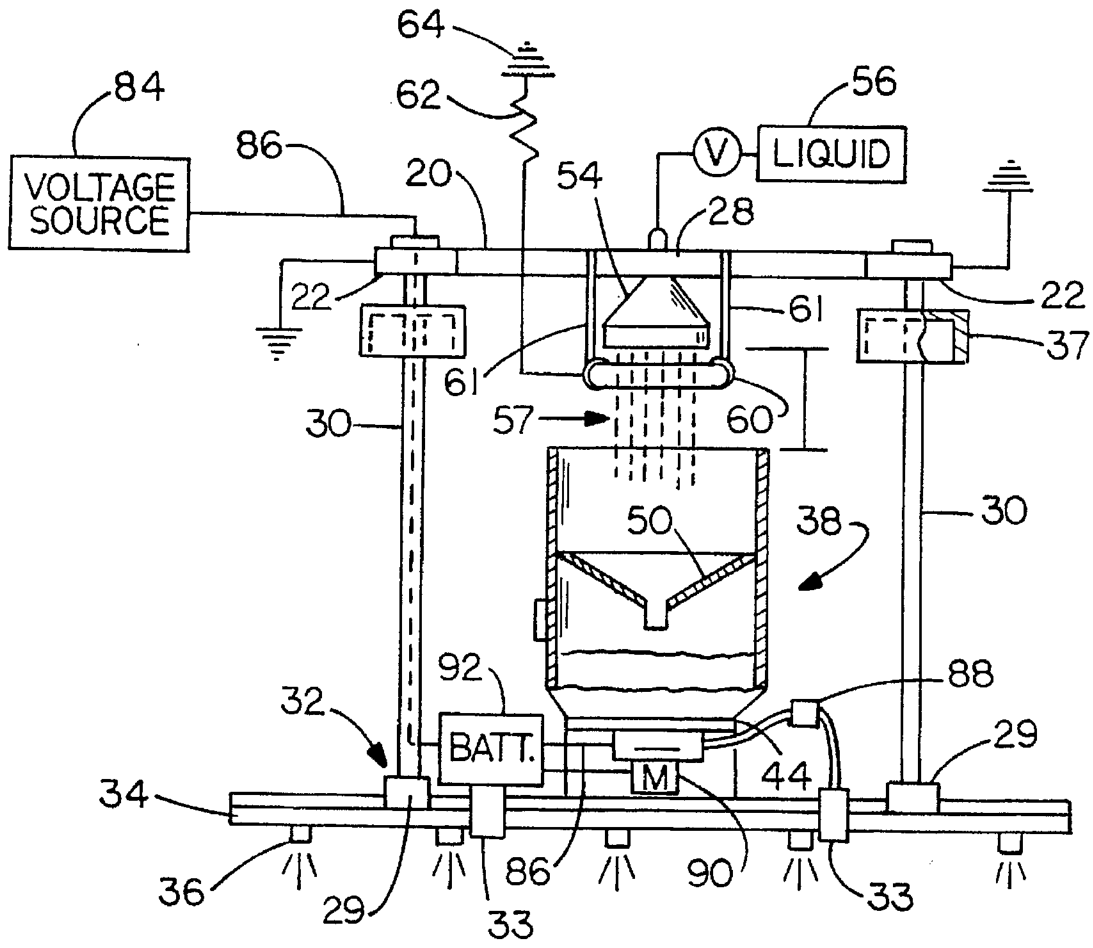
FIG. 7 is a schematic representation similar to FIG. 2 but illustrating a battery operated motor for driving the pump used with the spray system of the present invention.

FIG. 7 is an illustration similar to that shown in FIG. 2, and similar parts are similarly numbered. In this form of the invention, an electric motor 90 is used for driving the pump 44, and motor 90 is provided with a battery 92 or other power supply right on the insulated high voltage support or platform 32 so that there is no chance for current leakage back through power lines running from exterior sources to the motor 90. Again, the power supply and motor 90 are self-contained on the platform 32, with no direct connections back to ground.

It has been found that maintaining the distance from the sprinkler head 54 to the lines or surface where the liquid column contacts the funnel portion 50 or upper portion 45 of liquid container 38 at a sufficiently large distance prevents any substantial current leakage back to ground through the liquid column and sprinkler head. If the diameter of the liquid container 38 used is large enough, the sprinkler head 54 can actually be inside the container, but as shown it is spaced above the open top of container 38 to conserve mounting space and yet operate satisfactorily.

The insulator rods 30 serve to electrically isolate insulated rods 31 forming the high voltage support or frame 32 from the rest of the vehicle frame or machine that supports it. The same type of support can be used for fixed installations relative to grounded portions of a building or other frames.

The pressure for the spray nozzles is provided directly from the pump 44, and the liquid is charged after it leaves the liquid container 38. The charge or voltage is also carried by the liquid in the container.

The motor for driving the pump 44, and the pump itself are in a dry environment, that is, outside of the liquid container, and also the manifold valve connected to the pump is in a dry environment. Hoses or lines used with the manifold are not only made of insulator material, but also are kept away from the machine or frame to reduce current leakage.

Figure 8:
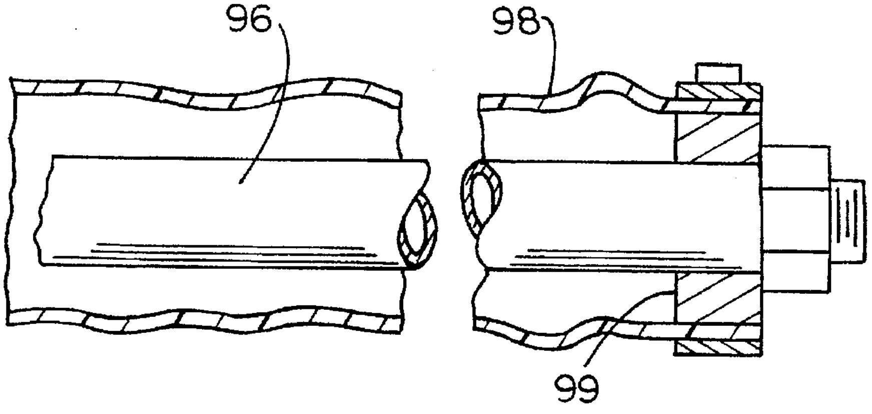
FIG. 8 is a sectional view of a double line arrangement used to reduce current leakage with hoses or lines.

In FIG. 8 a system of double insulated lines is shown particularly for output lines from the pump 44, carrying the high voltage liquid. An inner hose 96 is made of insulating material and is surrounded by a larger hose or sleeve 98, also of insulating material. The ends of hose 96 are clamped through insulating collars 99, onto the inner hose 96. The outer sleeve 98 forms an air gap with the outer surface of hose 96 to aid in reducing current leakage from the charged fluid carrying hose 96 to low potential structures.

The double insulated hose using an outer sleeve 98 with an air gap also can be used for high voltage line 86. The air gap aids in achieving adequate insulation.

It should be noted that the hydraulic lines or air lines, if a air motor is used for driving the pump, can be passed through the tubular insulating rods 30, along with the high voltage lead 86. The exit openings from the tubular rods 30 can be sealed to prevent moisture from getting into the interior of the rods 30, which may promote a path for current leakage.

Controlling the pressure at the sprinkler head 54 also can be helpful in reducing the current leakage back to ground. The higher the pressure, the less the water tends to go to the container sidewalls, but the more current tends to feed back to the water supply, because the liquid streams become more constant rather than intermittent. There is a balance between the pressure of the supply from the liquid to the shower head to avoid conduction back to ground, either by way of the streams of water or by having the distance between the container walls and the shower head reduced. The high voltage line 86, and the high voltage connection to the pump 44, as well as the voltage applying electrode, which is the pump housing, are all on the exterior of the liquid container and are not subjected to a mist or spray, or to direct liquid contact.

Mounting of an insulating frame 32, which directly carries the high voltage components, onto insulating supports that space the frame 32 from grounded supports or members, and mounting all of the high voltage components on the electrically isolated, insulating frame 32 minimizes current leakage and loss, which is one of the problems with electrostatic spray systems. The liquid container 38 is not pressured in the present invention, which eliminates the need for having an air pressure source connected to the wet container. The arrangement shown keeps current leakage back to the sprinkler head very low, generally 10 to 20 microamps.

The sprinkler head 54 can be mounted on the low voltage portion of the frame, as shown, and the distance from the charge container and/or the liquid made sufficient so that it will not cause current leakage. The high voltage source may be in the range of 20,000 to 60,000 volts. Current carried by the liquid is in the range of up to 500 microamps.

It should be noted that electrically isolating the pump drive by use of a hydraulic motor, air motor or self-contained electric motor is useable with closed container or closed charge tank systems of the prior art as well.

The drive can be powered with electrically isolated hydraulic or air lines that reduce the likelihood of current leakage, and the power components and pump are not in a liquid environment. A small diesel engine also can be used to power the pump, if desired. The fuel supply could be carried on the insulated frame 32, or transfered through non-conductive fuel lines from the low voltage area of the machine.

Although the present invention has been described with reference to preferred embodiments, workers skilled in the art will recognize that changes may be made in form and detail without departing from the spirit and scope of the invention.

What is claimed is:

1. An electrostatic spray system for spraying liquids carrying an electrostatic charge comprising a low voltage frame supported in a low voltage environment;

a support;

electric isolation links depending from the frame for supporting the support relative to the frame;

a liquid container mounted on and above the support;

a sprinkler head mounted on the low voltage frame for supplying liquid to the liquid container, the liquid container having an open top for receiving the liquid from the sprinkler head;

a pump mounted on the support for receiving liquid from the liquid container and providing a pressure output, and including a pump drive motor electrically isolated from the low voltage frame for driving the pump; and a high voltage line for providing an electrostatic charge to the liquid which is provided as an output by the pump.

2. The system of claim 1, wherein said pump drive motor comprises a hydraulic motor connected to a power source using non-conductive hydraulic liquid and non-conductive hoses for carrying the hydraulic liquid.

3. The system of claim 1 wherein said pump drive motor comprises an air motor connected to source of air under pressure through non-conductive air pressure carrying lines.

4. The system of claim 1 wherein said pump drive motor comprises an electric motor, and a power source mounted entirely on the support for powering the electric motor such that the motor is fully insulated from the low voltage frame.

5. The system of claim 1, wherein said links comprise elongated tubular insulator rods connected between the low voltage frame and the support and a separate inverted wall member having an upper side wall portion sealed to the respective insulator rod and having depending wall portions defining an edge surrounding the respective insulator rod and spaced therefrom to block moisture migration along the rods.

6. The system of claim 5, and a high voltage source supported spaced from the support and connected to the high voltage line, the high voltage line extending through an interior of at least one of the tubular insulator rods to the support.

7. The system of claim 1, wherein the pump and a pump drive motor are mounted on an exterior of the liquid container.

8. The system of claim 7, wherein the high voltage line extends solely on the exterior of the liquid container.

9. The system of claim 7, wherein said liquid container comprises a two-section container having a lower section and an upper section, the upper section having a funnel bottom portion terminating in an outlet opening having a substantially vertical axis in use substantially centered relative to walls forming the liquid container lower section, and a splash guard aligned with the opening to reduce splashing back through the opening into the upper section of the container from liquid present in the lower section, the opening being above a normal maximum height of liquid in the lower section.

10. The system of claim 9, wherein said splash guard comprises a cylindrical tube connected to the opening, said tube having a sidewall formed around a central axis centered on the opening, a plurality of outlets formed in the sidewall, and a plate blocking a lower end of the tube to cause liquid to flow from an upper portion of the container to a lower portion only through the outlets in the sidewalls of the tube.

11. The system of claim 1, and a ring of electrically conductive material surrounding the liquid exiting the sprinkler head and a substantial size resistor forming a substantial block to current flow connected to the ring and to a low potential.

12. The system of claim 1, wherein the sprinkler head is connected to a valve controlling flow to maintain intermittent liquid streams from the sprinkler head to the liquid container, and wherein the sprinkler head is spaced from the liquid container a selected amount to reduce current leakage from the liquid container back to the sprinkler head.

13. The system of claim 1, wherein the support comprises a pair of spaced elongated electrically insulating material members, at least one block of insulating material joining the elongated member, the block being connected to on link for supporting the support, the liquid container, pump and pump drive motor being supported on an insulating housing spanning the space between the elongated members.

14. An electrostatic spray system for spraying liquids carrying an electrostatic charge comprising an electrically grounded support structure;

a pair of transverse, spaced elongated members of electrically insulating material and at least one block of electrically insulating material holding the elongated members together;

an electrical isolation link depending from the support structure for supporting the block spaced from grounded surfaces of the support structure;

a liquid container mounted on the elongated members;

a sprinkler head mounted on the support structure for supplying liquid to the liquid container;

a pump mounted on the elongated members for receiving liquid from the liquid container and providing a pressure output, and including a pump drive motor electrically isolated from the support structure for driving the pump; and a high voltage line for providing an electrostatic charge to the liquid which is provided as an output by the pump.

15. The system of claim 14, wherein said elongated members are held together by two blocks at spaced locations along the elongated members, and wherein there are a pair of isolation links, one supporting each block.

16. The system of claim 15, and a pair of insulating arms extending outwardly from one of the elongated members, and a spray tube supported on the ends of the arms spaced from the one elongated member and connected to receive the pressure output of the pump.

17. An electrostatic spray system for spraying liquids carrying an electrostatic charge comprising a source of stored spray liquid on a mobile frame including a sprinkler head for providing a sprinkler column of spray liquid from a source;

the mobile frame having at least one arm having an outer end;

an open-top container spaced from the sprinkler head for receiving the liquid;

electrical isolator support link connected to the arm and depending therefrom for supporting the container relative to the mobile frame; and a pressurization system for receiving liquid from the open-top container and including a high voltage input for electrostatically charging the liquid being discharged from the pressurization system.

18. The electrostatic spray system of claim 17, wherein said open-top container comprises a lower section for storing a quantity of liquid, and an upper section forming the open top, said upper section having a funnel shaped bottom leading to an opening between the upper section and the lower section for discharging liquid into the lower section.

19. The electrostatic spray system of claim 18, and a splash guard below the opening from the upper section to the lower section to reduce the likelihood of the liquid stored in the lower section from splashing into the upper section.

20. The electrostatic spray system of claim 17, wherein said pressurization system comprises a pump for receiving liquid from the lower section, and a fluid pressure powered motor isolated electrically from low voltage sources and connected to a pressure source through nonconductive lines for driving the pump, said container being made of an electrically insulating material and the liquid in the lower section being at atmospheric pressure.

21. An electrostatic spray system for spraying liquids carrying an electrostatic charge comprising:

a liquid container for supplying a conductive liquid;

a high voltage line for providing a high voltage electrostatic charge to the liquid;

a pump mounted for receiving liquid from the liquid container and being subject to the high voltage charge of the liquid; and a pump drive motor electrically isolated from a low voltage support for driving the pump comprising a hydraulic motor connected to a hydraulic pressure source using non-conductive hydraulic liquid and non-conductive hoses for carrying the hydraulic liquid.

* * * * *